US009228509B2

United States Patent
Maeda (10) Patent No.: US 9,228,509 B2
(45) Date of Patent: Jan. 5, 2016

(54) MOTOR CONTROL APPARATUS THAT GENERATES PRELOAD TORQUE VALUE AS FUNCTION OF MOTOR ACCELERATION

(71) Applicant: FANUC CORPORATION, Yamanashi (JP)

(72) Inventor: Kazuomi Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 108 days.

(21) Appl. No.: 14/205,487

(22) Filed: Mar. 12, 2014

(65) Prior Publication Data
US 2014/0261306 A1  Sep. 18, 2014

(30) Foreign Application Priority Data

Mar. 13, 2013 (JP) .................................. 2013-050817

(51) Int. Cl.
| G05B 19/404 | (2006.01) |
| F02D 25/00 | (2006.01) |
| H02P 5/46 | (2006.01) |

(52) U.S. Cl.
CPC .............. *F02D 25/00* (2013.01); *G05B 19/404* (2013.01); *H02P 5/46* (2013.01); *G05B 2219/41264* (2013.01); *G05B 2219/41265* (2013.01); *G05B 2219/41426* (2013.01); *G05B 2219/50216* (2013.01)

(58) Field of Classification Search
CPC ................... G05B 19/404; G05B 2219/41078; G05B 2219/50216; G05B 2219/50218; G05B 2219/50234
See application file for complete search history.

(56) References Cited

U.S. PATENT DOCUMENTS

| 3,833,847 | A | | 9/1974 | Kelling |
| 5,646,495 | A | | 7/1997 | Toyozawa et al. |
| 5,704,250 | A | * | 1/1998 | Black ..................... B23Q 5/408 318/48 |
| 8,680,805 | B2 | * | 3/2014 | Sonoda .................... H02P 5/50 318/400.14 |
| 8,686,680 | B2 | * | 4/2014 | Deegan .................. F16H 57/12 160/170 |

(Continued)

FOREIGN PATENT DOCUMENTS

| JP | 4514450 B | 5/1970 |
| JP | 4347709 A | 12/1992 |

(Continued)

OTHER PUBLICATIONS

English Translation of Abstract for Japanese Publication No. 2003042258, published Feb. 13, 2003, 1 page.

(Continued)

*Primary Examiner* — Erick Solis
(74) *Attorney, Agent, or Firm* — Fredrikson & Byron, P.A.

(57) ABSTRACT

A preload torque value generating unit (22$m$) generates a preload torque value (Tpm) as a function of the acceleration ($a_m$) of a main motor (6$m$), the preload torque value (Tpm) being a torque value that is appended in advance to a torque command value (Tm) so that the direction of force applied to the main motor (6$m$) and the direction of force applied to a sub motor (6$s$) will become opposite to each other. A preload torque value generating unit (22$s$) generates a preload torque value (Tps) as a function of the acceleration ($a_s$) of the sub motor (6$s$), the preload torque value (Tps) being a torque value that is appended in advance to a torque command value (Ts) so that the direction of force applied to the main motor (6$m$) and the direction of force applied to the sub motor (6$s$) will become opposite to each other.

3 Claims, 7 Drawing Sheets

(56) References Cited

U.S. PATENT DOCUMENTS

| | | | |
|---|---|---|---|
| 2001/0028228 A1* | 10/2001 | Toyozawa | G05B 19/19 318/34 |
| 2004/0015933 A1* | 1/2004 | Campos | G05B 19/404 717/160 |
| 2006/0186845 A1 | 8/2006 | Terada et al. | |
| 2009/0237026 A1 | 9/2009 | Panaitescu et al. | |
| 2010/0181955 A1 | 7/2010 | Maeda et al. | |
| 2011/0237386 A1 | 9/2011 | Hirtt et al. | |

FOREIGN PATENT DOCUMENTS

| | | |
|---|---|---|
| JP | 816246 A | 1/1996 |
| JP | 08174481 A | 7/1996 |
| JP | 2003042258 A | 2/2003 |
| JP | 2003079180 A | 3/2003 |
| JP | 2010172054 A | 8/2010 |
| JP | 2010236603 A | 10/2010 |
| WO | 2004092859 A1 | 10/2004 |

OTHER PUBLICATIONS

English Concise Explanation of the Relevance of JP S45-14450 B, 1 page.
English Abstract, JPH04347709 (A), Dec. 2, 1992, 1 page.
English Abstract, JP2010236603 (A), Oct. 21, 2010, 1 page.

* cited by examiner

MOTOR CONTROL APPARATUS THAT GENERATES PRELOAD TORQUE VALUE AS FUNCTION OF MOTOR ACCELERATION

CROSS-REFERENCE TO RELATED APPLICATIONS

This application is a new U.S. patent application that claims benefit of JP 2013-050817, filed on Mar. 13, 2013, and the entire content of JP 2013-050817 is hereby incorporated by reference.

FIELD OF THE INVENTION

The present invention relates to a motor control apparatus for controlling two motors in order to drive a single driven member.

BACKGROUND OF THE INVENTION

In machine tools or the like, there are cases where a motor-driven member cannot be accelerated or decelerated using a single motor because the driven member is large. There are also cases where the driven member cannot be moved in a stable condition because the backlash between the driven member and the machine element of the transmission mechanism connected to the motor drive shaft is large. In such cases, tandem control is performed in which two motors are used to drive a single driven member (for example, refer to Japanese Unexamined Patent Publications No. JP-A-8-174481, JP-A-2003-79180, or JP-A-2004-92859).

In such tandem control, one of the two motors functions as a main motor having a drive shaft that acts as a master shaft connected to the transmission mechanism. The other one functions as a sub motor having a drive shaft that acts as a slave shaft connected to the transmission mechanism.

There is also proposed a motor drive apparatus that generates a preload torque value when performing tandem control in order to suppress the backlash between the driven member and the machine element of the transmission mechanism connected to the motor drive shaft (for example, refer to Japanese Unexamined Patent Publications No. JP-A-8-16246 or JP-A-2010-172054). The preload torque value is a torque value that is appended in advance to the torque command value so that the direction of force applied to the drive shaft of the main motor and the direction of force applied to the drive shaft of the sub motor will become opposite to each other.

In the motor drive apparatus that generates the preload torque value according to the prior art, the magnitude of the preload torque value is constant, irrespective of the magnitude of acceleration of the main motor or sub motor. As a result, during acceleration/deceleration of the main motor, the acceleration/deceleration torque required on the drive shaft of the main motor may become larger than the preload torque value of the main motor. On the other hand, during acceleration/deceleration of the sub motor, the acceleration/deceleration torque required on the drive shaft of the sub motor may become larger than the preload torque value of the sub motor.

In such cases, either the direction of force applied to the drive shaft of the main motor or the direction of force applied to the drive shaft of the sub motor becomes opposite to the direction of the preload torque applied to suppress the backlash. This can result in an inability to suppress the backlash occurring between the driven member and the machine element of the transmission mechanism connected to the motor drive shaft.

It is an object of the present invention to provide a motor control apparatus which, when driving a single driven member using two motors, can suppress the backlash occurring between the driven member and the machine element of the transmission mechanism connected to the motor drive shaft, even during acceleration/deceleration of the motors.

SUMMARY OF THE INVENTION

According to an embodiment of the present invention, there is provided a motor control apparatus for controlling a first motor and a second motor in order to drive a single driven member, the motor control apparatus comprising: a torque command value generating unit which generates a first torque command value for the first motor and a second torque command value for the second motor, based on at least one set selected from among a set comprising a position command value for the first motor, position information of the first motor, and speed information of the first motor, a set comprising a position command value for the second motor, position information of the second motor, and speed information of the second motor, and a set comprising a position command value for the driven member, position information of the driven member, and speed information of the driven member; a first preload torque value generating unit which calculates first acceleration corresponding to acceleration of the first motor, and generates a first preload torque value as a function of the first acceleration, the first preload torque value being a torque value that is appended in advance to the first torque command value so that the direction of force applied to a drive shaft of the first motor and the direction of force applied to a drive shaft of the second motor will become opposite to each other; a second preload torque value generating unit which calculates second acceleration corresponding to acceleration of the second motor, and generates a second preload torque value as a function of the second acceleration, the second preload torque value being a torque value that is appended in advance to the second torque command value so that the direction of force applied to the drive shaft of the first motor and the direction of force applied to the drive shaft of the second motor will become opposite to each other; a first motor driving unit which drives the first motor based on the first torque command value and the first preload torque value; and a second motor driving unit which drives the second motor based on the second torque command value and the second preload torque value.

Preferably, when the magnitude of the first acceleration exceeds a preset value, the first preload torque value generating unit generates the first preload torque value so that an output torque larger than a first acceleration/deceleration torque required on the drive shaft of the first motor during acceleration/deceleration of the first motor will be produced on the drive shaft of the first motor, and when the magnitude of the second acceleration exceeds a preset value, the second preload torque value generating unit generates the second preload torque value so that an output torque larger than a second acceleration/deceleration torque required on the drive shaft of the second motor during acceleration/deceleration of the second motor will be produced on the drive shaft of the second motor.

Preferably, when the magnitude of the first acceleration exceeds a preset value, the first preload torque value generating unit generates the first preload torque value so that an output torque larger than a first acceleration/deceleration torque required on the drive shaft of the first motor during acceleration/deceleration of the first motor will be produced on the drive shaft of the first motor, and modifies the generated first preload torque value based on a prescribed time constant, and when the magnitude of the second acceleration exceeds a preset value, the second preload torque value generating unit generates the second preload torque value so that an output torque larger than a second acceleration/deceleration torque required on the drive shaft of the second motor during acceleration/deceleration of the second motor will be produced on the drive shaft of the second motor, and modifies the generated second preload torque value based on a prescribed time constant.

According to an embodiment of the present invention, when driving a single driven member using two motors, the backlash occurring between the driven member and the machine element of the transmission mechanism connected to the motor drive shaft can be suppressed, even during acceleration/deceleration of the motors.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
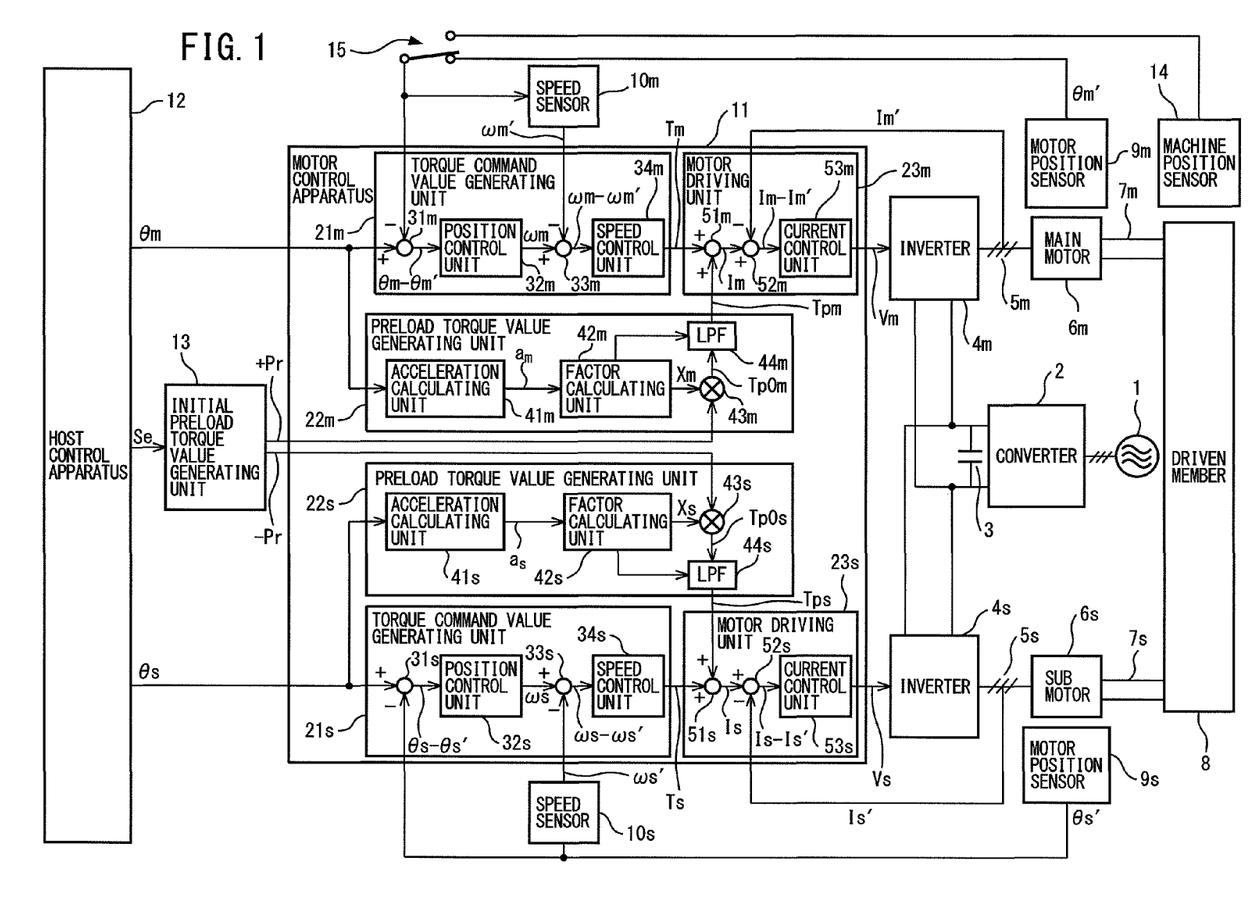
FIG. 1 is a block diagram of a system incorporating a motor control apparatus according to an embodiment of the present invention.

Embodiments of motor control apparatus according to the present invention will be described in detail with reference to the drawings. Throughout the drawings, the same component elements will be designated by the same reference numerals. FIG. 1 is a block diagram of a system incorporating a motor control apparatus according to an embodiment of the present invention. The system shown in FIG. 1 includes a three-phase AC power supply 1, a converter 2, a smoothing capacitor 3, inverters 4m and 4s, current sensors 5m and 5s, a main motor 6m as a first motor, a sub motor 6s as a second motor, transmission mechanisms 7m and 7s, a driven member 8, motor position sensors 9m and 9s, speed sensors 10m and 10s, a motor control apparatus 11, a host control apparatus 12, an initial preload torque value generating unit 13, a machine position sensor 14, and a position selector 15.

The three-phase AC power supply 1 is constructed from a commercial AC power supply. The converter 2 comprises, for example, a plurality of rectifier diodes (six in the case of three-phase AC) and transistors connected in reverse parallel with the respective rectifier diodes, and converts the AC power supplied from the three-phase AC power supply 1 into DC power.

The smoothing capacitor 3 is connected in parallel with the converter 2 and smoothes the voltage rectified by the rectifier diodes of the converter 2. The inverters 4m and 4s are each connected in parallel with the smoothing capacitor 3. The inverters 4m and 4s each comprise, for example, a plurality of rectifier diodes (six in the case of three-phase AC) and transistors connected in reverse parallel with the respective rectifier diodes. The inverters 4m and 4s convert the DC power output from the converter 2 into AC power by turning the transistors on and off, based on PWM signals Vm and Vs to be described later.

The current sensor 5m is provided on the output line of the inverter 4m in order to detect the value Im' of the current flowing to the main motor 6m. The current sensor 5s is provided on the output line of the inverter 4s in order to detect the value Is' of the current flowing to the sub motor 6s. In the present embodiment, the current sensors 5m and 5s are each constructed, for example, from a Hall element.

The main motor 6m has a drive shaft that acts as a master shaft connected to the transmission mechanism 4m, and is driven by the power stored in the smoothing capacitor 3. The sub motor 6m has a drive shaft that acts as a slave shaft connected to the transmission mechanism 4s, and is driven by the power stored on the smoothing capacitor 3.

In the present embodiment, the main motor 6m and the sub motor 6s are each constructed, for example, from a rotating servo motor in which either the rotor or the stator is a permanent magnet, a linear servo motor in which either the stator or the slider is a permanent magnet, a vibrating servo motor in which either the stator or the vibrator is a permanent magnet, or an induction motor that does not use any permanent magnets.

The transmission mechanisms 7m and 7s are connected to the driven member 8 in order to move the driven member 8 along the axial direction of the transmission mechanisms 7m and 7s. The driven member 8 is, for example, a table of a machine tool or an arm of an industrial robot.

The motor position sensor 9m is constructed from a rotary encoder, Hall element, resolver, or the like that detects the rotation angle θm' of the main motor 6m as the position information of the first motor. The motor position sensor 9s is constructed from a rotary encoder, Hall element, resolver, or the like that detects the rotation angle θs' of the sub motor 6s as the position information of the second motor.

The speed sensor 10m takes as an input the rotation angle θm' of the main motor 6m from the motor position sensor 9m, obtains the rotational speed ωm' of the main motor 6m as the speed information of the first motor by taking the first derivative of the rotation angle θm' with respect to time, and supplies the rotational speed ωm' to the motor control apparatus 11.

The speed sensor 10s takes as an input the rotation angle θs' of the sub motor 6s from the motor position sensor 9s, obtains the rotational speed ωs' of the sub motor 6s as the speed information of the second motor by taking the first derivative of the rotation angle θs' with respect to time, and supplies the rotational speed ωs' to the motor control apparatus 11.

The motor control apparatus 11 performs tandem control by driving the driven member 8 using the main motor 6m and the sub motor 6s in order to suppress the torsion of the drive shaft of the main motor 6m and the torsion of the drive shaft of the sub motor 6s while at the same time reducing the backlash between the driven member 8 and the machine elements of the transmission mechanisms 7m and 7s. For this purpose, the motor control apparatus 11 includes two torque command value generating units 21m and 21s as torque command value generating units, a preload torque command value generating unit 22m as a first preload torque command value generating unit, a preload torque command value generating unit 22s as a second preload torque command value generating unit, a motor driving unit 23m as a first motor driving unit, and a motor driving unit 23s as a second motor driving unit.

The torque command value generating unit 21m generates a torque command value Tm for the main motor 6m as a first torque command value for the first motor, based on a position command value θm for the main motor 6m which is supplied as the position command value for the first motor from the host control apparatus 12, and on the rotation angle θm' which is supplied from the motor position sensor 9m. For this purpose, the torque command value generating unit 21m includes a subtractor 31m, a position control unit 32m, a subtractor 33m, and a speed control unit 34m.

The subtractor 31m has a minuend input terminal at which the position command value θm is input from the host control apparatus 12, a subtrahend input terminal at which the rotation angle θm' is input from the motor position sensor 9m, and an output terminal which outputs the position error θm-θm' to the position control unit 32m.

To control the position of the main motor 6m, the position control unit 32m takes the position error θm-θm' as an input from the subtractor 31m, and retrieves a position control gain to be used for the main motor 6m from a memory (not shown). Then, based on the position error θm-θm' and the position control gain to be used for the main motor 6m, the position control unit 32m generates a speed command value ωm for the main motor 6m, and supplies the generated speed command value ωm to the subtractor 33m.

The subtractor 33m has a minuend input terminal at which the speed command value ωm is input from the position control unit 32m, a subtrahend input terminal at which the rotational speed ωm' is input from the speed sensor 10m, and an output terminal which outputs the speed error ωm-ωm' to the speed control unit 34m.

To control the speed of the main motor 6m, the speed control unit 34m takes the speed error ωm-ωm' as an input from the subtractor 33m, and retrieves a proportional gain and integral gain to be used for the main motor 6m from a memory (not shown). Then, based on the speed error ωm-ωm' and the proportional gain and integral gain to be used for the main motor 6m, the speed control unit 34m generates a torque command value Tm, and supplies the generated torque command value Tm to the motor driving unit 23m.

The torque command value generating unit 21s generates a torque command value Ts for the sub motor 6s as a second torque command value for the second motor, based on a position command value θs for the sub motor 6s which is supplied as the position command value for the second motor from the host control apparatus 12, and on the rotation angle θs' which is supplied from the motor position sensor 9s. For this purpose, the torque command value generating unit 21s includes a subtractor 31s, a position control unit 32s, a subtractor 33s, and a speed control unit 34s.

The subtractor 31s has a minuend input terminal at which the motor position command value θs is input from the host control apparatus 12, a subtrahend input terminal at which the rotation angle θs' is input from the motor position sensor 9s, and an output terminal which outputs the position error θs-θs' to the position control unit 32s.

To control the position of the sub motor 6s, the position control unit 32s takes the position error θs-θs' as an input from the subtractor 31s, and retrieves a position control gain to be used for the sub motor 6s from a memory (not shown). Then, based on the position error θs-θs' and the position control gain to be used for the sub motor 6s, the position control unit 32s generates a speed command value ωs for the sub motor 6s, and supplies the generated speed command value ωs to the subtractor 33s.

The subtractor 33s has a minuend input terminal at which the speed command value ωs is input from the position control unit 32s, a subtrahend input terminal at which the rotational speed ωs' is input from the speed sensor 10s, and an output terminal which outputs the speed error ωs-ωs' to the speed control unit 34s.

To control the speed of the sub motor 6s, the speed control unit 34s takes the speed error ωs-ωs' as an input from the subtractor 33s, and retrieves a proportional gain and integral gain to be used for the sub motor 6s from a memory (not shown). Then, based on the speed error ωs-ωs' and the proportional gain and integral gain to be used for the sub motor 6s, the speed control unit 34s generates a torque command value Ts, and supplies the generated torque command value Ts to the motor driving unit 23s.

The preload torque value generating unit 22m calculates the acceleration $a_m$ of the main motor 6m as the first motor acceleration. The preload torque value generating unit 22m generates a preload torque value Tpm as a function of the acceleration $a_m$; the preload torque value Tpm is a torque value that is appended in advance to the torque command value Tm so that the direction of force applied to the drive shaft of the main motor 6m and the direction of force applied to the drive shaft of the sub motor 6s will become opposite to each other. For this purpose, the preload torque value generating unit 22m includes an acceleration calculating unit 41m, a factor calculating unit 42m, a multiplier 43m, and a low-pass filter (LPF) 44m.

The acceleration calculating unit 41m takes the position command value θm as an input from the host control apparatus 12, and calculates the acceleration $a_m$ by taking the second derivative of the position command value θm with respect to time. The acceleration calculating unit 41m passes the thus calculated acceleration $a_m$ to the factor calculating unit 42m.

Based on the acceleration $a_m$, the factor calculating unit 42m calculates the factor Xm by which to multiply the initial preload torque value +Pr that is output as a preset value from the initial preload torque value generating unit 13.

The multiplier 43m takes as inputs the initial preload torque value +Pr from the initial preload torque value generating unit 13 and the factor Xm from the factor calculating unit 42m, and produces an intermediate preload value Tp0m as the product of the initial preload torque value +Pr and the factor Xm.

The low-pass filter 44m generates the preload torque value Tpm by modifying the intermediate preload value Tp0m based on a prescribed time constant τ which is a preset value. The low-pass filter 44m outputs the thus generated preload torque value Tpm to the motor driving unit 23m.

The preload torque value generating unit 22s calculates the acceleration $a_s$ of the sub motor 6s as the second motor acceleration. The preload torque value generating unit 22s generates a preload torque value Tps as a function of the acceleration $a_s$; the preload torque value Tps is a torque value that is appended in advance to the torque command value Ts so that the direction of force applied to the drive shaft of the main motor 6m and the direction of force applied to the drive shaft of the sub motor 6s will become opposite to each other. For this purpose, the preload torque value generating unit 22s includes an acceleration calculating unit 41s, a factor calculating unit 42s, a multiplier 43s, and a low-pass filter (LPF) 44s.

The acceleration calculating unit 41s takes the position command value θs as an input from the host control apparatus 12, and calculates the acceleration $a_s$ by taking the second derivative of the position command value θs with respect to time. The acceleration calculating unit 41s passes the thus calculated acceleration $a_s$ to the factor calculating unit 42s.

Based on the acceleration $a_s$, the factor calculating unit 42s calculates the factor Xs by which to multiply the initial preload torque value −Pr (i.e., the preload torque value equal in magnitude but opposite in sign to the initial preload torque value +Pr) that is output as a preset value from the initial preload torque value generating unit 13.

The multiplier 43s takes as inputs the initial preload torque value −Pr from the initial preload torque value generating unit 13 and the factor Xs from the factor calculating unit 42s, and produces an intermediate preload value Tp0s as the product of the initial preload torque value −Pr and the factor Xs.

The low-pass filter 44s generates the preload torque value Tps by modifying the intermediate preload value Tp0s based on the time constant T. The low-pass filter 44s outputs the thus generated preload torque value Tps to the motor driving unit 23s.

In the present embodiment, the initial preload torque value +Pr, the intermediate preload value Tp0m, and the preload torque value Tpm correspond to the first preload torque value, and the initial preload torque value −Pr, the intermediate preload value Tp0s, and the preload torque value Tps correspond to the second preload torque value.

The motor driving unit 23m drives the main motor 6m, based on the torque command value Tm and the preload torque value Tpm. For this purpose, the motor driving unit 23m includes an adder 51m, a subtractor 52m, and a current control unit 53m.

The adder 51m has a first addend input terminal at which the torque command value Tm is input from the speed control unit 34m, a second addend input terminal at which the preload torque value Tpm is input from the low-pass filter 44m, and an output terminal which outputs the sum of the torque command value Tm and the preload torque value Tpm as the current command value Im for the main motor 6m.

The subtractor 52m has a minuend input terminal at which the current command value Im is input from the adder 51m, a subtrahend input terminal at which the current value Im' is input from the current sensor 5m, and an output terminal which outputs a current error Im-Im', i.e., the difference between the current command value Im and the current value Im', to the current control unit 53m.

Based on the current error Im-Im' input from the subtractor 52m, the current control unit 53m generates the PWM signal Vm as the voltage command value for the main motor 6m. The current control unit 53m supplies the generated PWM signal Vm to the inverter 4m.

The motor driving unit 23s drives the sub motor 6s, based on the torque command value Ts and the preload torque value Tps. For this purpose, the motor driving unit 23s includes an adder 51s, a subtractor 52s, and a current control unit 53s.

The adder 51s has a first addend input terminal at which the torque command value Ts is input from the speed control unit 34s, a second addend input terminal at which the preload torque value Tps is input from the low-pass filter 44s, and an output terminal which outputs the sum of the torque command value Ts and the preload torque value Tps as the current command value Is for the sub motor 6s.

The subtractor 52s has a minuend input terminal at which the current command value Is is input from the adder 51s, a subtrahend input terminal at which the current value Is' is input from the current sensor 5s, and an output terminal which outputs a current error Is-Is', i.e., the difference between the current command value Is and the current value Is', to the current control unit 53s.

Based on the current error Is-Is' input from the subtractor 52s, the current control unit 53s generates the PWM signal Vs as the voltage command value for the sub motor 6s. The current control unit 53s supplies the generated PWM signal Vs to the inverter 4s.

The host control apparatus 12, which is, for example, a computer numerically controlled (CNC) apparatus or the like, supplies the position command value θm to the subtractor 31m and the acceleration calculating unit 41m and the position command value θs to the subtractor 31s and the acceleration calculating unit 41s, and also supplies an excitation signal Se for generating the initial preload torque values +Pr and −Pr to the initial preload torque value generating unit 13.

In response to the excitation signal Se from the host control apparatus 12, the initial preload torque value generating unit 13 generates the initial preload torque values +Pr and −Pr and supplies the thus generated initial preload torque values +Pr and −Pr to the multipliers 43m and 43s, respectively.

The machine position sensor 14 is constructed from a scale, etc. for detecting, as the position information of the driven member, the position of the machine (not shown) containing the transmission mechanisms 7m and 7s. The position selector 15 includes a switch for connecting the subtrahend input terminal of the subtractor 31m to either the motor position sensor 9m or the machine position sensor 14 in accordance with a command entered from an operation unit (not shown).

In the system shown in FIG. 1, the position selector 15 is set to connect the subtrahend input terminal of the subtractor 31m to the motor position sensor 9m, and the present embodiment has been described for the case where the subtrahend input terminal of the subtractor 31m is connected by the position selector 15 to the motor position sensor 9m.

When the position selector 15 is set to connect the subtrahend input terminal of the subtractor 31m to the machine position sensor 14, the position of the machine (not shown) detected by the machine position sensor 14 is input as the position information of the driven member to the subtrahend input terminal of the subtractor 31m. The speed of the driven member 8 is detected by the speed sensor 10m and input as the speed information of the driven member to the subtrahend input terminal of the subtractor 33m. The host control apparatus 12 outputs the position command value for the machine (not shown) which is input as the position command value for the driven member to the minuend input terminal of the subtractor 33m.

In the present embodiment, the speed sensors 10m and 10s, the motor control apparatus 11, and the initial preload torque value generating unit 13 are implemented by a processor equipped with input/output ports, a serial communication circuit, an A/D converter, a comparator, etc., and the process—to be described later—is performed in accordance with a processing program stored in a memory (not shown).

Figure 2:
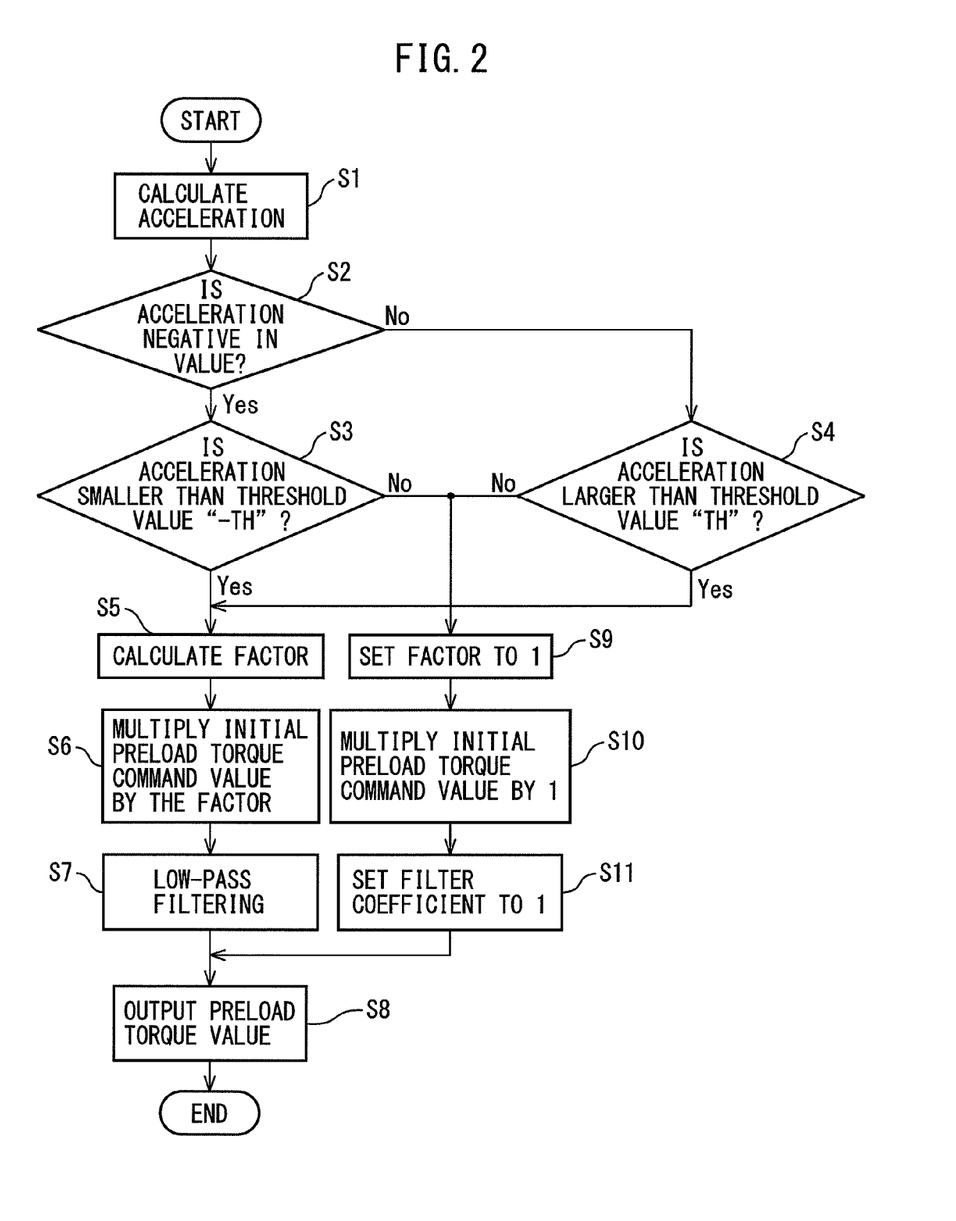
FIG. 2 is a flowchart illustrating the operation of the motor control apparatus shown in FIG. 1.

FIG. 2 is a flowchart illustrating the operation of the motor control apparatus shown in FIG. 1. The flowchart is carried out under the control of a processing program executed on the motor control apparatus 11, each time the initial preload torque value generating unit 13 generates the initial preload torque values +Pr and −Pr in response to the excitation signal Se.

First, the acceleration calculating unit 41m, 41s calculates the acceleration $a_m$, $a_s$, and passes the calculated acceleration $a_m$, $a_s$ to the factor calculating unit 42m, 42s (step S1). After that, the factor calculating unit 42m, 42s determines whether the calculated acceleration $a_m$, $a_s$ is negative in value or not (step S2). If the acceleration $a_m$, $a_s$ is negative in value, the factor calculating unit 42m, 42s then determines whether the acceleration $a_m$, $a_s$ is smaller than a threshold value −TH (TH is a positive value) which is a preset value (step S3). On the other hand, if the acceleration $a_m$, $a_s$ is not smaller in value than zero, the factor calculating unit 42m, 42s then determines whether the acceleration $a_m$, $a_s$ is larger than a threshold value TH (step S4).

If the acceleration $a_m$, $a_s$ is smaller than the threshold value −TH, or if the acceleration $a_m$, $a_s$ is larger than the threshold value TH, the factor calculating unit 42m, 42s calculates the factor Xm, Xs, and supplies the calculated factor Xm, Xs to the multiplier 43m, 43s. In the present embodiment, when the acceleration $a_m$, $a_s$ is smaller than the threshold value −TH, the factor calculating unit 42m, 42s calculates the factor Xm, Xs by using the following equation (1) or (2), respectively.

$$Xm=1+(a_m+TH)\alpha \quad (1)$$

$$Xs=1+(a_s+TH)\alpha \quad (2)$$

In the equations (1) and (2), $\alpha$ represents the slope to be described later. On the other hand, when the acceleration $a_m$, $a_s$ is larger than the threshold value TH, the factor calculating unit 42m, 42s calculates the factor Xm, Xs by using the following equation (3) or (4), respectively.

$$Xm=1+(a_m-TH)\alpha \quad (3)$$

$$Xs=1+(a_s-TH)\alpha \quad (4)$$

Next, the multiplier 4m produces the intermediate preload value Tp0m by taking the product of the initial preload torque value +Pr and the factor Xm, and supplies the produced intermediate preload value Tp0m to the low-pass filter 44m. The multiplier 4s produces the intermediate preload value Tp0s by taking the product of the initial preload torque value −Pr and the factor Xs, and supplies the produced intermediate preload value Tp0s to the low-pass filter 44s (step S6).

The low-pass filter 44m performs filtering in order to generate the preload torque value Tpm by modifying the intermediate preload value Tp0m based on the time constant $\tau$, and outputs the thus generated preload torque value Tpm to the adder 51m. The low-pass filter 44s performs filtering in order to generate the preload torque value Tps by modifying the intermediate preload value Tp0s based on the time constant $\tau$ (step S7), and outputs the thus generated preload torque value Tps to the adder 51s (step S8), after which the process flow is terminated.

In the present embodiment, the preload torque values Tpm and Tps can be expressed by the following equations (5) and (6), respectively.

$$Tpm=k \cdot Tpm+(1-k)Tp0m \quad (5)$$

$$Tps=k \cdot Tps+(1-k)Tp0s \quad (6)$$

$$k=1-e^{-(T/\tau)}$$

where T is the sampling period, and k is the coefficient calculated based on the time constant $\tau$ and sampling period T when performing filtering.

On the other hand, if it is determined in step S3 that the acceleration $a_m$, $a_s$ is not smaller than the threshold value −TH, or if it is determined in step S4 that the acceleration $a_m$, $a_s$ is not larger than the threshold value TH, the factor calculating unit 42m, 42s sets the factor Xm, Xs to 1 (step S9).

Next, the multiplier 43m multiplies the initial preload torque value +Pr by the factor Xm, i.e., 1, and supplies the intermediate preload torque value Tp0m corresponding to the initial preload torque value +Pr to the low-pass filter 44m. The multiplier 43s multiplies the initial preload torque value −Pr by the factor Xs, i.e., 1, and supplies the intermediate preload torque value Tp0s corresponding to the initial preload torque value −Pr to the low-pass filter 44s (step S10).

Next, the factor calculating unit 42m, 42s sets the filter coefficient for the low-pass filter 44m, 44s to 1 (step S11), after which the process proceeds to step S8

Figure 3A:
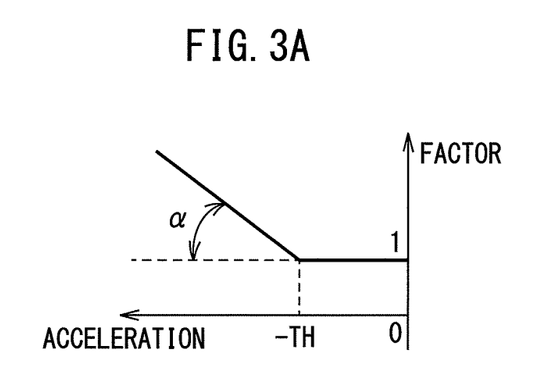
FIG. 3A is a diagram for explaining how a factor is calculated in the flowchart of FIG. 2.
Figure 3B:
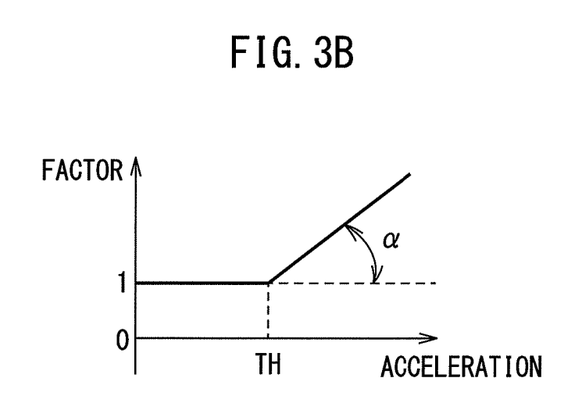
FIG. 3B is a diagram for explaining how a factor is calculated in the flowchart of FIG. 2.

FIGS. 3A and 3B are diagrams for explaining how the factor is calculated in the flowchart of FIG. 2. When the acceleration is negative in value, the factor is fixed to 1 as long as the acceleration is not smaller than the threshold value −TH, as indicated by a solid line in FIG. 3A. When the acceleration is smaller than the threshold value −TH, the factor increases in proportion to the slope $\alpha$ as the acceleration decreases.

On the other hand, when the acceleration is zero or positive in value, the factor is fixed to 1, as long as the acceleration is not larger than the threshold value TH, as indicated by a solid line in FIG. 3B; when the acceleration is larger than the threshold value TH, the factor increases in proportion to the slope $\alpha$ as the acceleration increases.

By thus varying the factor in proportion to the slope $\alpha$, when the acceleration becomes smaller than the threshold value −TH or becomes larger than the threshold value TH, the torque command value generating unit 21m generates the preload torque value Tpm so that an output torque larger than the acceleration/deceleration torque, i.e., the first acceleration/deceleration torque, required on the drive shaft of the main motor 6m during acceleration/deceleration of the main motor 6m will be produced on the drive shaft of the main motor 6m. On the other hand, the torque command value generating unit 21s generates the preload torque value Tps so that an output torque larger than the acceleration/deceleration torque, i.e., the second acceleration/deceleration torque, required on the drive shaft of the sub motor 6s during acceleration/deceleration of the sub motor 6s will be produced on the drive shaft of the sub motor 6s.

Figure 4:
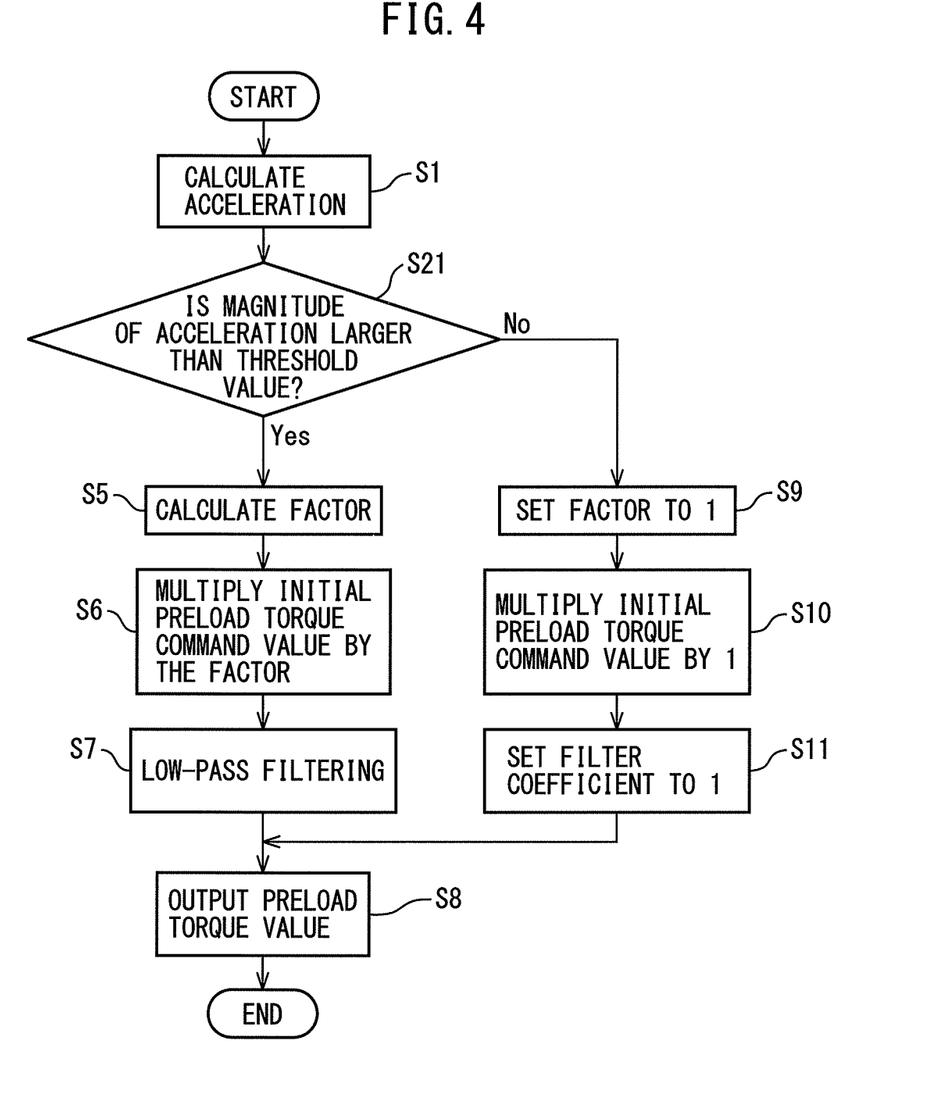
FIG. 4 is a diagram showing a modified example of the flowchart of FIG. 2.

FIG. 4 is a diagram showing a modified example of the flowchart of FIG. 2. The flowchart process shown here is carried out under the control of a processing program executed on the motor control apparatus 11, each time the initial preload torque value generating unit 13 generates the initial preload torque values +Pr and −Pr in response to the excitation signal Se.

In the flowchart shown in FIG. 4, after step S1, the factor calculating unit 42m, 42s determines whether the absolute value of the calculated acceleration $a_m$, $a_s$ is larger than the threshold value TH (step S21). If the absolute value of the acceleration $a_m$, $a_s$ is larger than the threshold value TH, the process proceeds to step S5. On the other hand, if the absolute value of the acceleration $a_m$, $a_s$ is not larger than the threshold value TH, the process proceeds to step S9.

Figure 5:
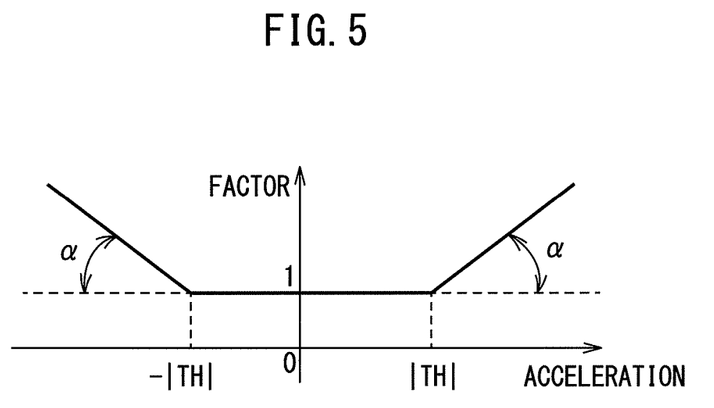
FIG. 5 is a diagram for explaining how a factor is calculated in the flowchart of FIG. 4.

FIG. 5 is a diagram for explaining how the factor is calculated in the flowchart of FIG. 4. When the absolute value of the acceleration is not larger than the threshold value TH, the factor is fixed to 1, as indicated by a solid line in FIG. 5, and when the absolute value of the acceleration is larger than the threshold value TH, the factor increases in proportion to the slope $\alpha$ as the absolute value of the acceleration increases.

By thus varying the factor in proportion to the slope $\alpha$, when the absolute value of the acceleration becomes larger than the threshold value TH, the torque command value generating unit 21m generates the preload torque value Tpm so that an output torque larger than the acceleration/deceleration torque required on the drive shaft of the main motor 6*m* during acceleration/deceleration of the main motor 6*m* will be produced on the drive shaft of the main motor 6*m*. On the other hand, the torque command value generating unit 21*s* generates the preload torque value Tps so that an output torque larger than the acceleration/deceleration torque required on the drive shaft of the sub motor 6*s* during acceleration/deceleration of the sub motor 6*s* will be produced on the drive shaft of the sub motor 6*s*.

Figure 6:
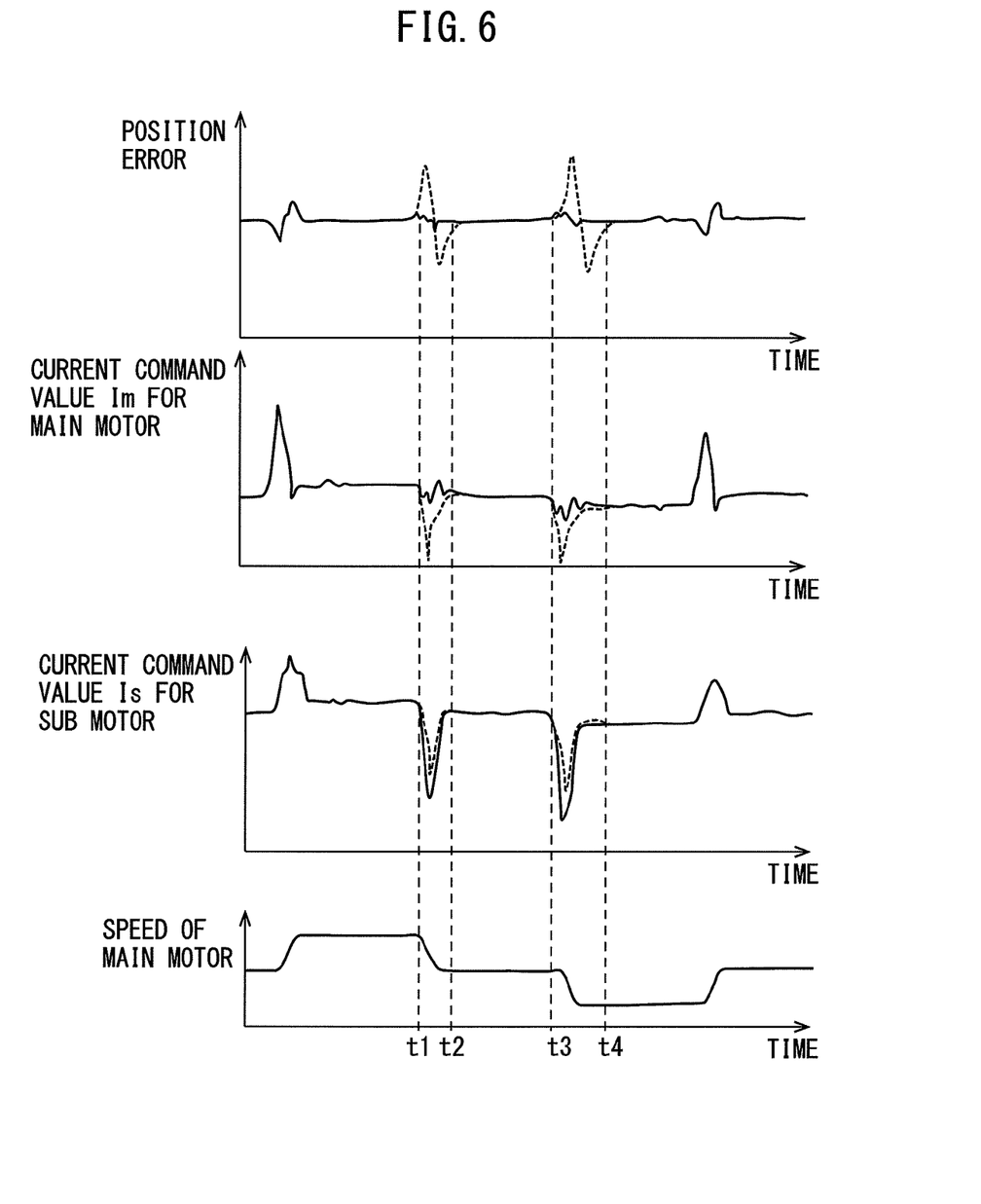
FIG. 6 is a diagram for explaining the advantageous effect of the motor control apparatus according to the present invention.

FIG. 6 is a diagram for explaining the advantageous effect of the motor control apparatus according to the present invention. FIG. 6 shows, in order from top to bottom, a graph showing how the position error changes with time, a graph showing how the current command value Im for the main motor 6*m* changes with time, a graph showing how the current command value Is for the sub motor 6*s* changes with time, and a graph showing how the speed of the main motor 6*m* changes with time.

When a constant preload torque value is generated irrespective of changes in motor acceleration, the position error, the current command value Im for the main motor 6*m*, and the current command value Is for the sub motor 6*s* change as indicated by broken lines. More specifically, during the deceleration of the main motor 6*m* over the period from time t1 to time t2, and during the deceleration of the main motor 6*m* over the period from time t3 to time t4, the fluctuation of the position error increases, resulting in an inability to suppress the backlash occurring between the driven member 8 and the machine elements of the transmission mechanisms 7*m* and 7*s* connected to the main motor 6*m* and sub motor 6*s*, respectively.

By contrast, when the preload torque value Tpm, Tps is generated in such a manner as to respond to changes in acceleration $a_m$, $a_s$, the position error, the current command value Im for the main motor 6*m*, and the current command value Is for the sub motor 6*s* change as indicated by solid lines. More specifically, during the deceleration of the main motor 6*m* over the period from time t1 to time t2, and during the deceleration of the main motor 6*m* over the period from time t3 to time t4, the fluctuation of the position error remains low, thus making it possible to suppress the backlash occurring between the driven member 8 and the machine elements of the transmission mechanisms 7*m* and 7*s* connected to the main motor 6*m* and sub motor 6*s*, respectively.

According to the present embodiment, since the preload torque value Tpm, Tps is generated in such a manner as to respond to changes in acceleration $a_m$, $a_s$, the backlash between the driven member 8 and the machine elements of the transmission mechanisms 7*m* and 7*s* can be suppressed, even during the acceleration/deceleration of the main motor 6*m* and sub motor 6*s* when driving the driven member 8 using the main motor 6*m* and sub motor 6*s*.

Further, according to the present embodiment, the preload torque value Tpm, Tps is maintained at a constant value, as long as the absolute value of the acceleration $a_m$, $a_s$ is not larger than the threshold value TH, and when the absolute value of the acceleration $a_m$, $a_s$ exceeds the threshold value TH, the preload torque value Tpm, Tps is increased as the absolute value of the acceleration $a_m$, $a_s$ increases. This serves to avoid a situation where excessive preload torque values Tpm and Tps are added to the torque command values Tm and Ts and applied to the drive shafts of the main motor 6*m* and sub motor 6*s*, respectively, when the main motor 6*m* and sub motor 6*s* are in a stopped condition or when the main motor 6*m* and sub motor 6*s* are running at constant speed.

Furthermore, according to the present embodiment, the preload torque values Tpm and Tps are generated by modifying the intermediate preload torque values Tp0*m* and Tp0*s*, respectively, based on the time constant τ. As a result, the impact caused by the backlash occurring between the driven member 8 and the machine elements of the transmission mechanisms 7*m* and 7*s* can be reduced.

Figure 7:
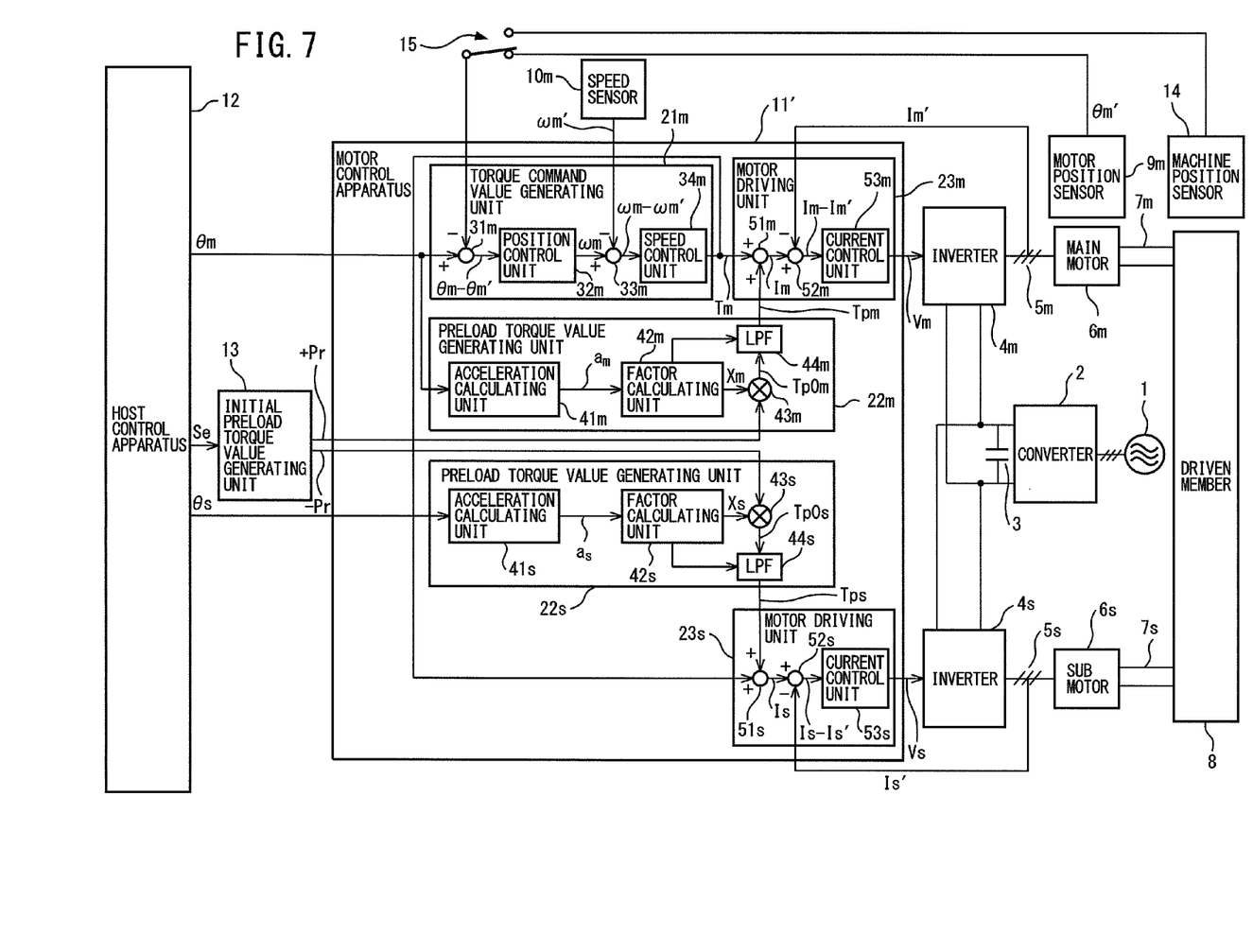
FIG. 7 is a block diagram of a system incorporating a motor control apparatus according to another embodiment of the present invention.

FIG. 7 is a block diagram of a system incorporating a motor control apparatus according to another embodiment of the present invention. The system shown in FIG. 7 includes a three-phase AC power supply 1, a converter 2, a smoothing capacitor 3, inverters 4*m* and 4*s*, current sensors 5*m* and 5*s*, a main motor 6*m* as a first motor, a sub motor 6*s* as a second motor, transmission mechanisms 7*m* and 7*s*, a driven member 8, a motor position sensor 9*m*, a speed sensor 10*m*, a motor control apparatus 11', a host control apparatus 12, an initial preload torque value generating unit 13, a machine position sensor 14, and a position selector 15.

The motor control apparatus 11' includes a single torque command value generating unit 21*m* as a torque command value generating unit, a preload torque command value generating unit 22*m*, a preload torque command value generating unit 22*s*, a motor driving unit 23*m*, and a motor driving unit 23*s*.

In the present embodiment, the torque command value Tm for the main motor 6*m* and sub motor 6*s* is supplied from the speed control unit 34*m* to the adders 51*m* and 51*s* as the first torque command value for the first motor and the second torque command value for the second motor, respectively.

According to the present embodiment, the motor control apparatus itself and the system incorporating the motor control apparatus can be simplified in order to implement the motor control apparatus according to the present invention.

The present invention is not limited to the above particular embodiments, and many changes and modifications can be made to the embodiments. For example, while the above embodiments have been described for the case where the acceleration $a_m$, $a_s$ is calculated based on the position command value θm, θs, the acceleration $a_m$, $a_s$ may be calculated based on the rotation angle θm', θs'.

The above embodiments have been described as having a configuration that includes the low-pass filters 44*m* and 44*s*. However, the low-pass filters 44*m* and 44*s* may be omitted.

Further, while the above embodiments have been described in the case where the acceleration values $a_m$ and $a_s$ are both calculated and the factors Xm and Xs are calculated using the respective acceleration values $a_m$ and $a_s$, the present invention is also applicable in the case where only one or the other of the acceleration values, $a_m$ or $a_s$, is calculated and the factors Xm and Xs are calculated using the calculated acceleration value $a_m$ or $a_s$.

The above embodiments have also been described in the case where the torque command values Tm and Ts are generated based on two sets, one comprising the position command value θm, rotation angle θm', and rotational speed ωm' and the other comprising the position command value θs, rotation angle θs', and rotational speed ωs', and the case where the torque command values Tm and Ts are generated based on the set comprising the position command value θm, rotation angle θm', and rotational speed ωm'. However, the torque command values Tm and Ts may be generated based on at least one set selected from among the set comprising the position command value θm, rotation angle θm', and rotational speed ωm', the set comprising the position command value θs, rotation angle θs', and rotational speed ωs', and the set comprising the position command for the machine not shown, the position information of the machine not shown, and the speed information of the driven member 8.

What is claimed is:

1. A motor control apparatus for tandem control of a first motor and a second motor in order to drive single driven member, said motor control apparatus comprising:
a torque command value generating unit which generates a first torque command value for said first motor and a second torque command value for said second motor, based on at least one set selected from among a set comprising a position command value for said first motor, position information of said first motor, and speed information of said first motor, a set comprising a position command value for said second motor, position information of said second motor, and speed information of said second motor, and a set comprising a position command value for said driven member, position information of said driven member, and speed information of said driven member;
a first preload torque value generating unit which calculates first acceleration corresponding to acceleration of said first motor, and calculates a first preload torque value to be a value which is proportional to an absolute value of said first acceleration and is larger than said first torque command value, said first preload torque value being a torque value that is appended in advance to said first torque command value so that the direction of force applied to a drive shaft of said first motor and the direction of force applied to a drive shaft of said second motor will become opposite to each other;
a second preload torque value generating unit which calculates second acceleration corresponding to acceleration of said second motor, and calculates a second preload torque value to be a value which is proportional to an absolute value of said second acceleration and is larger than said second torque command value, said second preload torque value being a torque value that is appended in advance to said second torque command value so that the direction of force applied to the drive shaft of said first motor and the direction of force applied to the drive shaft of said second motor will become opposite to each other;
a first motor driving unit which drives said first motor based on said first torque command value and said first preload torque value; and
a second motor driving unit which drives said second motor based on said second torque command value and said second preload torque value.

2. The motor control apparatus according to claim 1, wherein
when a predetermined threshold value is positive and when the magnitude of said first acceleration exceeds said threshold value, or when said threshold value is negative and when the magnitude of said first acceleration is less than said threshold value the first preload torque value generating unit generates said first preload torque value so that an output torque larger than a first acceleration/deceleration torque required on the drive shaft of said first motor during acceleration/deceleration of said first motor will be produced on the drive shaft of said first motor, and when the predetermined threshold value is positive and when the magnitude of said second acceleration exceeds said threshold value, or when said threshold value is negative and when the magnitude of said second acceleration is less than said threshold value the second preload torque value generating unit generates said second preload torque value so that an output torque larger than a second acceleration/deceleration torque required on the drive shaft of said second motor during acceleration/deceleration of said second motor will be produced on the drive shaft of said second motor.

3. The motor control apparatus according to claim 1, wherein the first preload torque value generating unit performs low-pass filtering said generated first preload torque value the second preload torque value generating unit performs low-pass filtering said generated second preload torque value.

* * * * *